(12) United States Patent
Pham

(10) Patent No.: US 9,688,178 B2
(45) Date of Patent: Jun. 27, 2017

(54) CHASSIS AND SUPPORT STRUCTURE ALIGNMENT

(71) Applicant: SCHLUMBERGER TECHNOLOGY CORPORATION, Sugar Land, TX (US)

(72) Inventor: Hau Nguyen-Phuc Pham, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 59 days.

(21) Appl. No.: 14/565,108

(22) Filed: Dec. 9, 2014

(65) Prior Publication Data

US 2015/0166135 A1 Jun. 18, 2015

Related U.S. Application Data

(60) Provisional application No. 61/915,283, filed on Dec. 12, 2013.

(51) Int. Cl.
| | |
|---|---|
| *B65D 88/30* | (2006.01) |
| *B60P 1/64* | (2006.01) |
| *B65G 69/00* | (2006.01) |
| *B65G 67/30* | (2006.01) |
| *B65G 67/40* | (2006.01) |

(52) U.S. Cl.
CPC ............ *B60P 1/6418* (2013.01); *B65D 88/30* (2013.01); *B65G 67/30* (2013.01); *B65G 67/40* (2013.01); *B65G 69/006* (2013.01); *Y10S 414/132* (2013.01)

(58) Field of Classification Search
CPC ........ B65D 88/30; B65D 88/32; B65D 88/54; B28C 7/0084; B28C 7/0495; B28C 9/0418; B28C 9/0427; B65G 67/24; B65G 67/30; B65G 69/006; Y10S 414/132
USPC .................................................. 414/332, 919
See application file for complete search history.

(56) References Cited

U.S. PATENT DOCUMENTS

| | | | | |
|---|---|---|---|---|
| 4,944,646 A | * | 7/1990 | Edwards | ............... B28C 9/0418 414/332 |
| 6,186,654 B1 | * | 2/2001 | Gunteret, Jr. | ......... B28C 7/0495 366/18 |

(Continued)

FOREIGN PATENT DOCUMENTS

| | | | | |
|---|---|---|---|---|
| DE | 3610263 A1 | * | 10/1986 | ............. B65D 88/30 |
| WO | 2014028317 A1 | | 2/2014 | |

*Primary Examiner* — James Keenan
(74) *Attorney, Agent, or Firm* — Michael L. Flynn; Jody Lynn DeStefanis; Robin Nava

(57) ABSTRACT

This disclosure introduces chassis alignment assemblies for aligning a chassis with a support structure. An example implementation includes a chassis having first wheels, a jacking assembly coupled to the chassis and having second wheels, and a jacking actuation member operable to vertically displace the second wheels relative to the chassis to engage the ground and raise the first wheels off of the ground such that the jacking assembly supports an end of the chassis. Another example implementation includes a chassis, having first wheels, and an outrigger assembly having: a frame movable between transport and alignment orientations; second wheels; and an outrigger actuation member operable to move the frame relative to the chassis.

8 Claims, 14 Drawing Sheets

(56) References Cited

U.S. PATENT DOCUMENTS

| | | | | |
|---|---|---|---|---|
| 6,474,926 B2* | 11/2002 | Weiss | ............ | B28C 7/0495 |
| | | | | 414/332 |
| 6,527,428 B2* | 3/2003 | Guntert, Jr. | ............ | B28C 9/0418 |
| | | | | 366/2 |
| 2005/0260062 A1* | 11/2005 | Boasso | ............ | B28C 7/0084 |
| | | | | 414/332 |
| 2012/0134772 A1* | 5/2012 | Herman | ............ | B65D 88/30 |
| | | | | 414/808 |
| 2013/0142601 A1* | 6/2013 | McIver | ............ | B65D 88/30 |
| | | | | 414/288 |

\* cited by examiner

CHASSIS AND SUPPORT STRUCTURE ALIGNMENT

CROSS-REFERENCE TO RELATED APPLICATIONS

This application claims the benefit of U.S. Provisional Application No. 61/915,283, entitled "SYSTEM FOR ALIGNING A CHASSIS WITH A SUPPORT STRUCTURE," filed Dec. 12, 2013, the entire disclosure of which is hereby incorporated herein by reference.

BACKGROUND OF THE DISCLOSURE

To facilitate the recovery of hydrocarbons from oil and gas wells, the subterranean formations surrounding such wells can be hydraulically fractured. Hydraulic fracturing may be used to create cracks in subsurface formations to allow oil and/or gas to move toward the well. The formation is fractured by introducing a specially engineered fluid, sometimes referred to as fracturing fluid or fracturing slurry, at high pressure and high flow rates into the formation through one or more wellbores. The fracturing fluids may be loaded with proppant, which are sized particles that may be mixed with the liquids of the fracturing fluid to help form an efficient conduit for production of hydrocarbons from the formation to the wellbore. Proppant may comprise naturally occurring sand grains or gravel, man-made proppants (e.g., fibers or resin-coated sand), high-strength ceramic materials (e.g., sintered bauxite), and/or other suitable materials. The proppant collects heterogeneously or homogeneously inside the fractures to prop open the fractures formed in the formation.

At the wellsite, proppant and other fracturing fluid components are blended at a low-pressure side of the wellsite pumping system. The oilfield materials often are delivered from storage facilities to a blender by pneumatic systems, which use air to convey the oilfield materials. Water and/or other liquids are then added, and the resulting fracturing fluid is delivered downhole under high pressure by the wellsite pumping system. Handling the proppant prior to blending may include transporting the proppant to the wellsite via trucks, then to holding silos or bins, and subsequently to the blending equipment. Prior to blending, the proppant handling and dispensing assemblies are assembled at the wellsite from equipment transported by trucks.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a chassis alignment assembly that includes a chassis comprising a first set of wheels, a jacking assembly coupled to the chassis and including an axle and one or more wheels operably connected to the axle, and a jacking actuation member coupled to the jacking assembly and the chassis and operable to vertically displace the one or more wheels of the jacking assembly relative to the chassis to engage a ground and raise the first set of wheels of the chassis off of the ground such that the jacking assembly supports an end of the chassis.

The present disclosure also introduces a chassis alignment assembly that includes a chassis, having wheels, and an outrigger assembly that includes a frame movably coupled to the chassis for movement between a transport orientation and an alignment orientation. The frame extends beyond an end of the chassis when in the alignment orientation. The outrigger assembly also includes an axle connected to the frame and extending transverse to a longitudinal axis of the chassis, a wheel connected to the axle, and an outrigger actuation member coupled between the frame and the chassis.

The present disclosure also introduces a method that includes positioning a modular silo in a substantially lateral orientation on a chassis. The chassis includes a set of wheels, supporting the chassis on a ground, and a jacking assembly that includes at least one wheel. The method also includes operating the jacking assembly to raise an end of the chassis to an alignment orientation such that the end of the chassis is at least partially supported by the at least one wheel of the jacking assembly, and such that the set of wheels of the chassis are unloaded. The method also includes moving the chassis while in the alignment orientation such that portions of the modular silo and a mobile support structure (MSS) overlap, and erecting the modular silo from the substantially lateral position to a substantially upright position while the chassis is in the alignment orientation.

The present disclosure also introduces a method that includes positioning a modular silo in a substantially lateral orientation on a chassis. The chassis includes an outrigger assembly having at least one wheel. The method also includes actuating the outrigger assembly to move a frame of the outrigger assembly downward into an alignment orientation such that the frame extends beyond an end of the chassis and is substantially aligned with an expandable base of a mobile support structure (MSS) to which the modular silo is to be assembled. The method also includes moving the chassis toward the MSS while the outrigger assembly is in the alignment orientation such that portions of the modular silo and the expandable base overlap, and such that the at least one wheel of the outrigger assembly engages a track of the expandable base. The modular silo is then erected from the substantially lateral orientation to a substantially upright orientation while the frame is in the alignment orientation.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
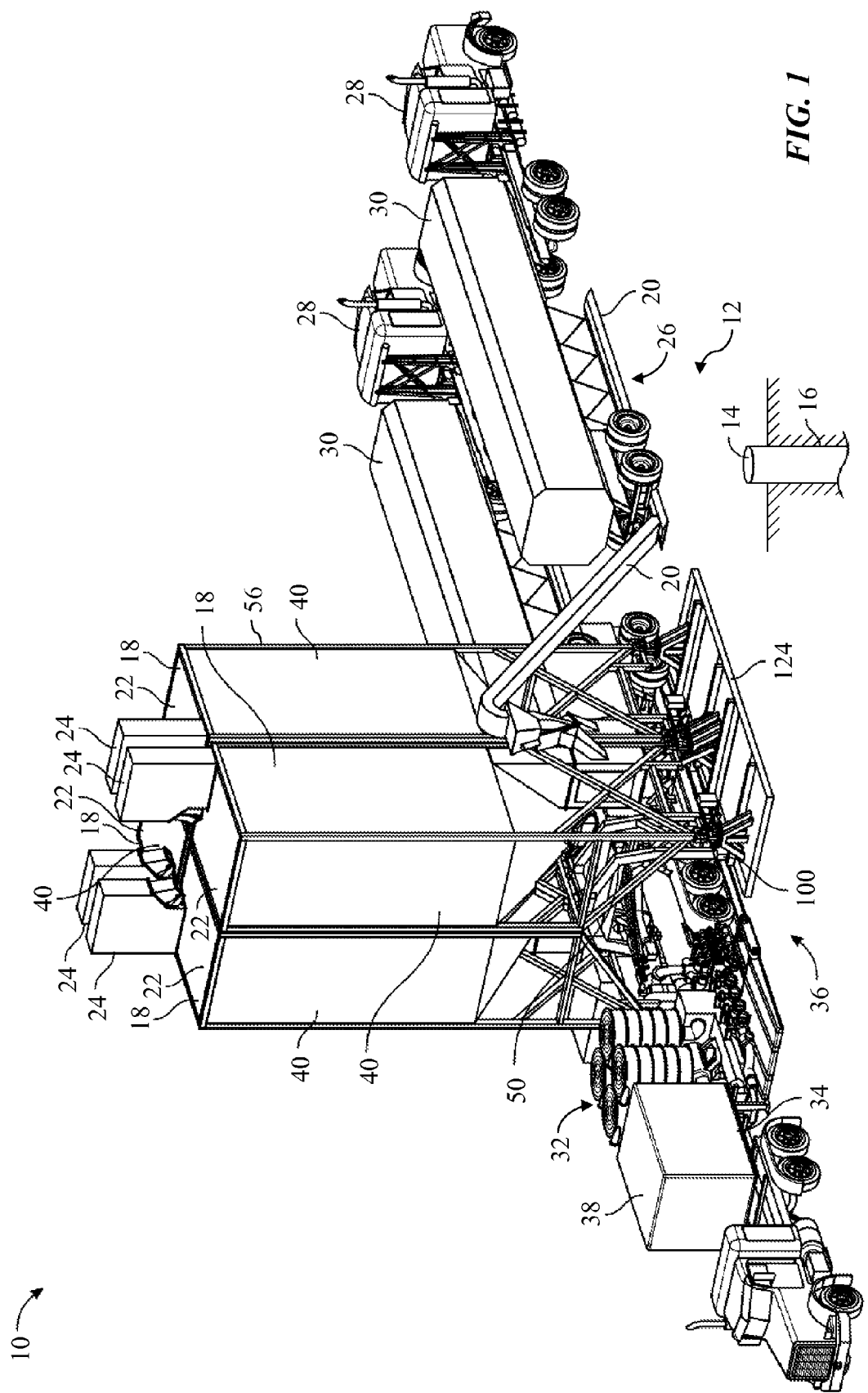
FIG. 1 is a perspective view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure introduces systems and methods that may facilitate the handling of oilfield materials in a space efficient manner. The oilfield material is stored in one or more modular silos in a manner permitting the use of gravity to feed the oilfield material to a blending system or other suitable equipment. A mobile support structure (MSS) receives and supports the one or more modular silos in a substantially vertical orientation at the wellsite. Each modular silo is transportable in a substantially horizontal orientation, and may be engaged with the MSS via one or more connections permitting controlled movement of each modular silo during erection from the substantially horizontal orientation to a substantially vertical operational orientation. For example, once engaged with the MSS, each modular silo may be pivoted to the substantially vertical orientation on the MSS. Oilfield material is then moved to an interior of a corresponding modular silo, and gravity may be used to feed the oilfield material to a blender or other equipment in a controlled manner.

Each modular silo may be transported in the substantially horizontal orientation on a chassis, such as may be or form a portion of a trailer pulled by a truck. The chassis may comprise a mobile erector assembly operable to erect the modular silo for installation on the MSS. The chassis may comprise vertical and/or lateral displacement mechanisms that may aid in aligning the modular silo with the MSS in the existence of vertical and/or horizontal misalignment. The chassis may comprise an outrigger that may aid in positioning an end of the chassis in such a way as to provide additional support to the modular silo during the erection process while the center of gravity of the modular silo is moving from over the chassis to over the MSS. The MSS may be implemented in a manner permitting the modular silo to be erected from its substantially horizontal position on the chassis to the upright, substantially vertical position at the wellsite, such that the modular silo may be mounted on the MSS. The MSS may also comprise alignment guides and/or tracks that may aid with alignment during the mounting process.

When the modular silo is being erected on the MSS, the center of gravity of the modular silo may transition from over the chassis to over the MSS. Such transition may result in an upwardly directed load being applied to the chassis. In this context, the chassis may comprise an articulated outrigger disposed at the proximate end of the chassis, such as may provide additional support to the chassis and the modular silo during the erection process, which may aid in reducing and/or counteracting the upwardly directed load applied to the chassis.

The present disclosure also introduces a chassis alignment assembly. In at least one implementation, the chassis alignment assembly comprises a chassis and a jacking assembly that includes a jacking actuation member. The chassis may also comprise a first set of wheels located at least partially underneath the support beam and operably connected to and supporting the second end of the chassis. The jacking assembly comprises at least one axle and a second set of wheels operably connected to the at least one axle and positioned in a substantially horizontal plane intersecting at least a portion of the first set of wheels. The jacking actuation member is operable to vertically displace the second set of wheels relative to the chassis, such as to engage the ground and subsequently raise the first set of wheels vertically off of the ground, whereby the jacking assembly supports the second end of the chassis.

The present disclosure also introduces another chassis alignment assembly comprising a chassis and an outrigger assembly. The chassis may comprise wheels, and the outrigger assembly may comprise a frame, one or more axles with wheels, and an outrigger actuation member connected to the frame and the chassis. The frame is movable between a transport orientation and an alignment orientation. In the alignment orientation, the frame extends beyond the proximate end of the chassis. The one or more axles extend transverse to the longitudinal axis of the chassis.

The present disclosure also introduces a method that includes positioning a modular silo in a lateral orientation on a chassis. The chassis comprises a first set of wheels and a jacking assembly with a second set of wheels. The method also includes operating the jacking assembly to move (e.g., substantially vertically) the chassis to an alignment orientation such that the chassis is at least partially supported by the second set of wheels of the jacking assembly. The chassis is then moved (e.g., backed up) while in the alignment orientation such that portions of the modular silo and an MSS overlap. The modular silo is then erected from the lateral orientation to an upright orientation on the MSS while the modular silo and MSS are in the alignment orientation.

The present disclosure also introduces a method that includes positioning a modular silo in a lateral orientation on a chassis. The chassis includes an outrigger assembly with a set of wheels. The outrigger assembly is then operated to move a frame of the outrigger assembly (e.g., downward) to an alignment orientation such that a frame of the outrigger assembly extends beyond the proximate end of the chassis and is substantially aligned with a horizontal plane intersecting the wheels. The chassis is then moved (e.g., backed up) toward an MSS while the outrigger assembly is in the alignment orientation, such that portions of the modular silo and the MSS overlap, and such that the wheels of the outrigger assembly engage a track of the MSS. The modular silo is then erected from the lateral orientation to an upright orientation on the MSS while the outrigger assembly is in the alignment orientation.

FIG. 1 is a perspective view of at least a portion of an example implementation of apparatus according to one or more aspects of the present disclosure. The apparatus includes a proppant delivery system 10, illustrated in position at a wellsite 12, and operable during the formation of a slurry suitable for fracturing formations. The proppant delivery system 10 may comprise various types of equipment, including vehicles, storage containers, material handling equipment, pumps, control systems, and other equipment operable in conjunction with the fracturing process.

The wellsite 12 is associated with a well 14 comprising at least one wellbore 16 extending into a subterranean formation (not shown). The proppant delivery system 10 comprises one or modular silos 18 that may be transported over-the-road by trucks able to operate on public roadways. The modular silos 18 store oilfield material such as a proppant used to prop open fractures upon fracturing of the subterranean formation, or guar used to increase the viscosity of a hydraulic fracturing fluid, among other examples within the scope of the present disclosure.

The modular silos 18 receive oilfield material via conveyors 20, and the oilfield material is lifted to an upper portion 22 of each modular silo 18 by corresponding vertical conveyors 24. The vertical conveyors 24 may be integral to the modular silos 18, or may be external to the modular silos 18, such as in implementations in which the conveyors 20, 24 are transported to and assembled at the wellsite 12. The conveyors 20, 24 may operate by carrying the oilfield material instead of blowing the oilfield material, such as may aid in reducing erosion of components and dusting of the area. One or more of the conveyors 20, 24 may be enclosed to further reduce dust generation as the oilfield material is delivered from an unload area 26 and into the modular silos 18.

Oilfield material transport trucks 28 may deliver oilfield material to the unload area 26. As in the example implementation depicted in FIG. 1, the trucks 28 may be tractor-trailer trucks having a trailer or other chassis 30, such as may be backed over a portion of a selected conveyor 20 for transfer of the oilfield material to the corresponding modular silo(s) 18.

The proppant delivery system 10 may comprise various other components not shown in FIG. 1. For example, the proppant delivery system 10 may include water tanks for supplying water that is mixed with the oilfield material to form the hydraulic fracturing fluid, as well as a pumping system for pumping the resulting mixture into the wellbore 16. The water tanks, pumping system, and/or other components not shown in FIG. 1 may also be truck-mounted, skid-mounted, or otherwise adapted for over-the-road transport to the wellsite 12.

The proppant delivery system 10 also comprises a blending system 32 operable to blend oilfield material delivered from the modular silos 18. For example, the blending system 32 may be or comprise a portable blender, such as a truck-mounted or skid-mounted blender. As in the example implementation depicted in FIG. 1, the blending system 32 may be mounted on a trailer or other chassis 34 that may be positioned (e.g., backed up) into a common area 36 positioned underneath or otherwise proximate the modular silos 18. For example, the common area 36 may be located below outer housings 40 of the modular silos 18, such that the outer housings 40 of the modular silos 18 at least partially overlap the common area 36.

The proppant delivery system 10 may also comprise a control facility 38 and/or other control components operable to facilitate a given fracturing operation. The control facility 38 and/or other control components may also be truck-mounted, skid-mounted, or otherwise adapted for over-the-road transport to the wellsite 12, perhaps including as a portion of the truck, trailer, and/or other chassis 34 carrying the blending system 32.

Figure 2:
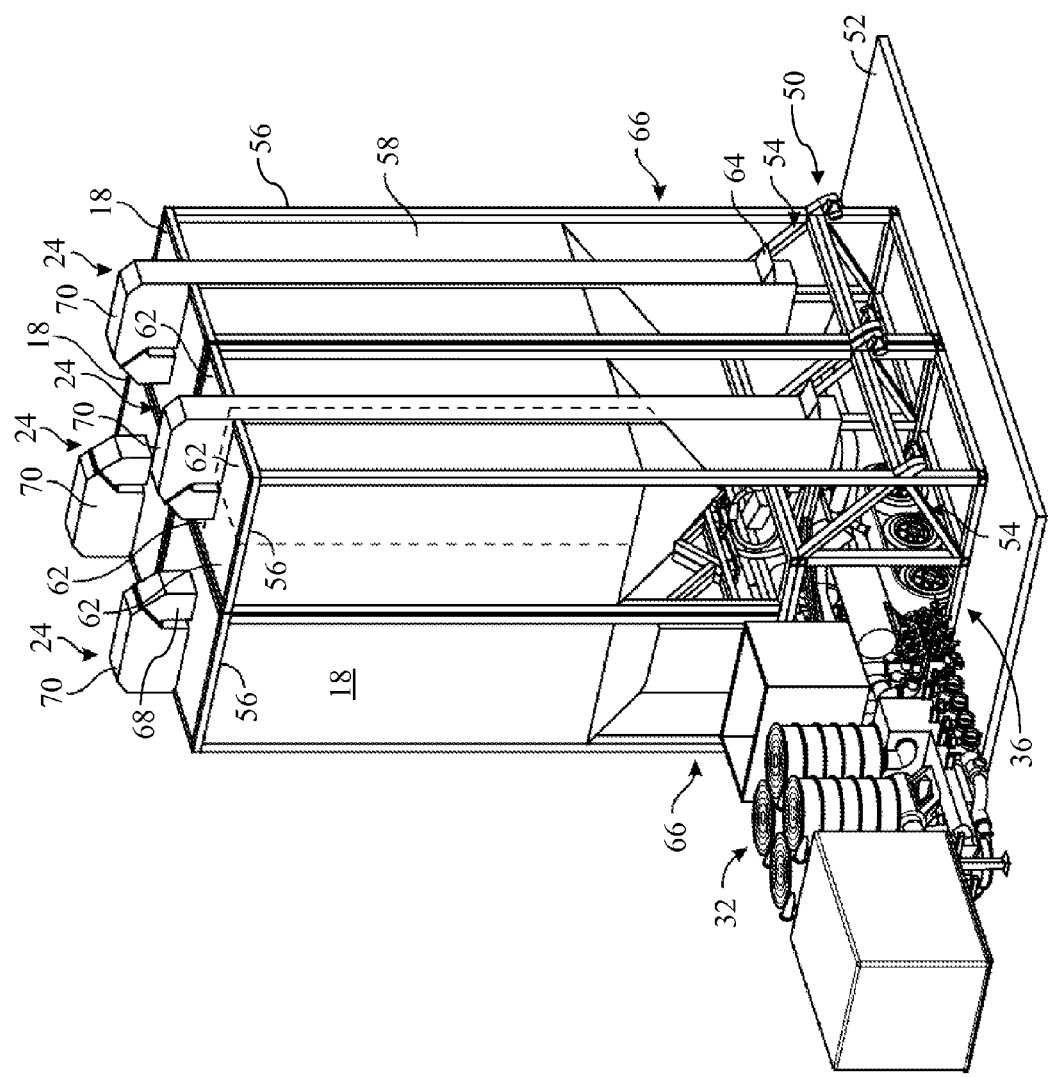
FIG. 2 is a perspective view of a portion of another example implementation of the apparatus shown in FIG. 1 according to one or more aspects of the present disclosure.

FIG. 2 is a perspective view of a portion of another example implementation of the apparatus shown in FIG. 1 in which the modular silos 18 are coupled together on an MSS 50. The MSS 50 may be mounted on a pad system and/or other base 52, which may be or comprise a concrete, gravel, and/or other pad. The base 52 may have other forms, however, perhaps including cement pads, compacted aggregate pads, pads constructed as portable structures, combinations of these elements, and/or other suitable pad types for supporting the modular silos 18. The base 52 may aid in distributing the load of the modular silos 18 over a larger area of ground.

The modular silos 18 may be releasably mounted to the MSS 50 in a substantially vertical or otherwise upright orientation. The MSS 50 comprises a number of silo-receiving regions 54 each associated with a corresponding modular silo 18. The MSS 50 and the silo-receiving regions 54 may position the modular silos 18 at a height sufficient to allow movement of the blending system 32 to a position beneath the modular silos 18 within the common area 36, such that the blending system 32 may receive a controlled outflow of oilfield material. For example, the MSS 50 may permit a truck-mounted, trailer-mounted, and/or other version of the blending system 32 to be driven (e.g., backed up) into position beneath the modular silos 18, as depicted in FIG. 2.

As depicted in the example implementations shown in FIGS. 1 and 2, the modular silos 18 may each comprise a silo frame 56 supporting the outer housing 40 and defining an enclosed interior (not shown) for holding oilfield material. Depending on the wellsite operation, the oilfield material may comprise naturally occurring sand grains or gravel, man-made proppants, resin coated sand, high-strength ceramic materials (e.g., sintered bauxite), other solids such as fibers, mica, mixtures of different sizes and/or types of oilfield materials, and/or other suitable oilfield materials. One or more of the modular silos 18 may be divided into compartments 62 for holding different types of oilfield materials that may be selectively released from the modular silo 18 and blended via the blending system 32.

Each enclosed vertical conveyor 24 may lift oilfield material (e.g., with or without blowing) from an inlet 64 (e.g., an inlet hopper disposed at a lower portion 66) to an upper discharge portion 68 for release into the enclosed interior of the modular silo 18 through a vertical conveyor head 70. Each conveyor head 70 may have a pivotable or otherwise moveable discharge, such as may be selectively controllable to deliver the oilfield material to a corresponding compartment 62 within a given modular silo 18.

Figure 3:
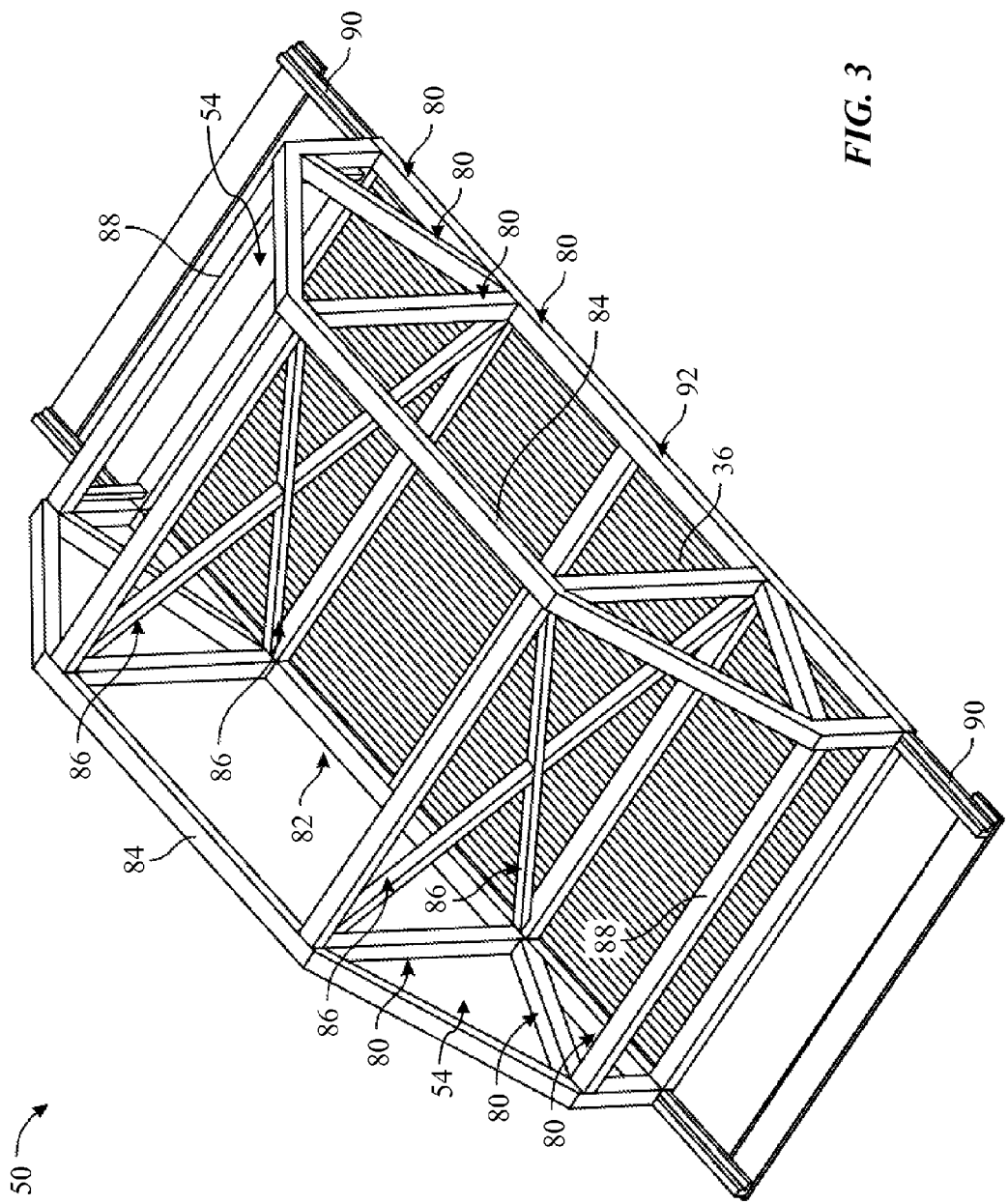
FIG. 3 is a perspective view of a portion of the apparatus shown in FIG. 2 according to one or more aspects of the present disclosure.

FIG. 3 is a perspective view of an example implementation of the MSS 50 shown in FIG. 2. The MSS 50 comprises struts 80 connected by suitable fastening methods to create a strong, stable structure for supporting the modular silos 18. Fastening methods may utilize welds, threaded fasteners, and/or other suitable types of fasteners. The struts 80 are connected to form silo-receiving regions 54. FIG. 3 depicts two silo-receiving regions 54, although other implementations may include a different number of silo-receiving regions 54. The MSS 50 also includes a region or passage 82 providing space for system equipment (e.g., the blending system 32) and/or otherwise at least partially defining the common area 36.

The MSS 50 may be arranged such that the silo-receiving regions 54 support the frames 56 of the modular silos 18 at a raised position and/or otherwise permitting metering equipment to meter the outflow of oilfield material into the blending system 32 when the blending system 32 is positioned in the passage 82. Upper struts 84 may connect the silo-receiving regions 54 and provide an upper support for at least a portion of the frames 56 of the modular silos 18. The upper struts 84 may be positioned at a height sufficient to permit the truck-mounted and/or other portable blending system 32 to be driven (e.g., backed up) into the passage 82 to receive oilfield material from the modular silos 18. However, the upper struts 84 may also be split and/or supported by additional substantially vertical or otherwise positioned struts (not shown), such as may permit separation of the silo-receiving regions 54. Such separation of the silo-receiving regions 54 may permit individual ones or groups of the modular silos 18 to be separated, such as may provide a space through which the blending system 32 and/or other equipment may be positioned (e.g., driven) between the separated modular silos 18.

The MSS 50 may also comprise crossing struts 86, such as may be positioned at various locations to enhance the rigidity and/or strength of the MSS 50. The MSS 50 may also comprise pivot struts 88 to which pivot connectors may be attached, as described below. The pivot struts 88 may strengthen at least a region of the MSS 50 to which each modular silo 18 may be initially engaged and then pivoted about during erection of each modular silo 18 from the substantially lateral position to the substantially upright, operational position. The pivot struts 88 may be positioned at a height substantially matching corresponding pivot connectors of the modular silo frame 56 when the modular silo 18 is mounted substantially laterally on a suitable over-the-road truck 28 in a transportation orientation.

The MSS 50 may also comprise or be connected with at least one expandable base 90. The expandable base 90 may stabilize the MSS 50 and the modular silos 18, including while the modular silos are transitioned into and mounted in the substantially upright position on the MSS 50. As depicted in the example implementation shown in FIG. 3, multiple expandable bases 90 may be movably connected with a base portion 92 of the MSS 50. The one or more expandable bases 90 may be slidably received in the base portion 92 for movement between a retracted position in the base portion 92 and an extended position, as depicted in FIG. 3, to stabilize the MSS 50. The extension and contraction of the one or more expandable bases 90 may be performed by one or more suitable actuators, such as may include hydraulic cylinders and/or other actuators, step motors and/or other electric actuators, and/or other actuators that operate a screw, jack, and/or other adjustment mechanism coupled to the one or more expandable bases 90. The one or more expandable bases 90 may also or instead be manually transitioned between the extended and contracted positions. The number and/or orientation of the expandable bases 90 may also be varied according to the parameters of a given application.

Returning to FIG. 1, the proppant delivery system 10 may include an MSS 100, shown in FIG. 1 and other figures, instead of the MSS 50 shown in FIGS. 2 and 3. However, the MSS 100 may comprise, be substantially similar to, and/or otherwise have one or more aspects in common with the MSS 50 shown in FIGS. 2 and/or 3. Accordingly, subsequent reference herein to the MSS 100 may also or instead refer to the MSS 50 shown in FIGS. 2 and 3, or both the MSS 50 and the MSS 100. Thus, the MSS 50 and the MSS 100 are hereafter referred to collectively as the MSS 100, where applicable.

Figure 4:
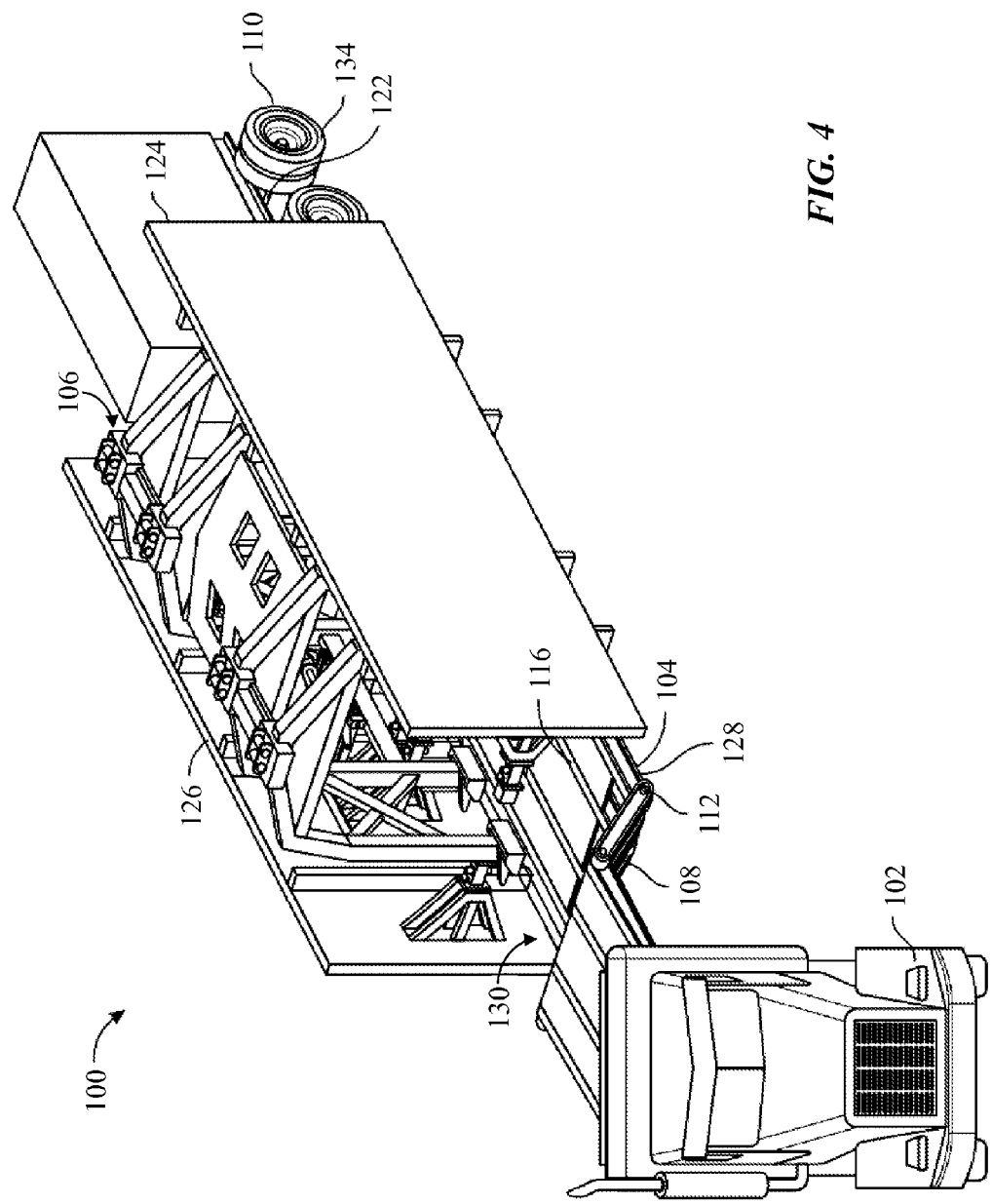
FIGS. 4-6 are perspective views of at least a portion of an example implementation of the apparatus shown in FIG. 1 during different stages of operation according to one or more aspects of the present disclosure.
Figure 5:
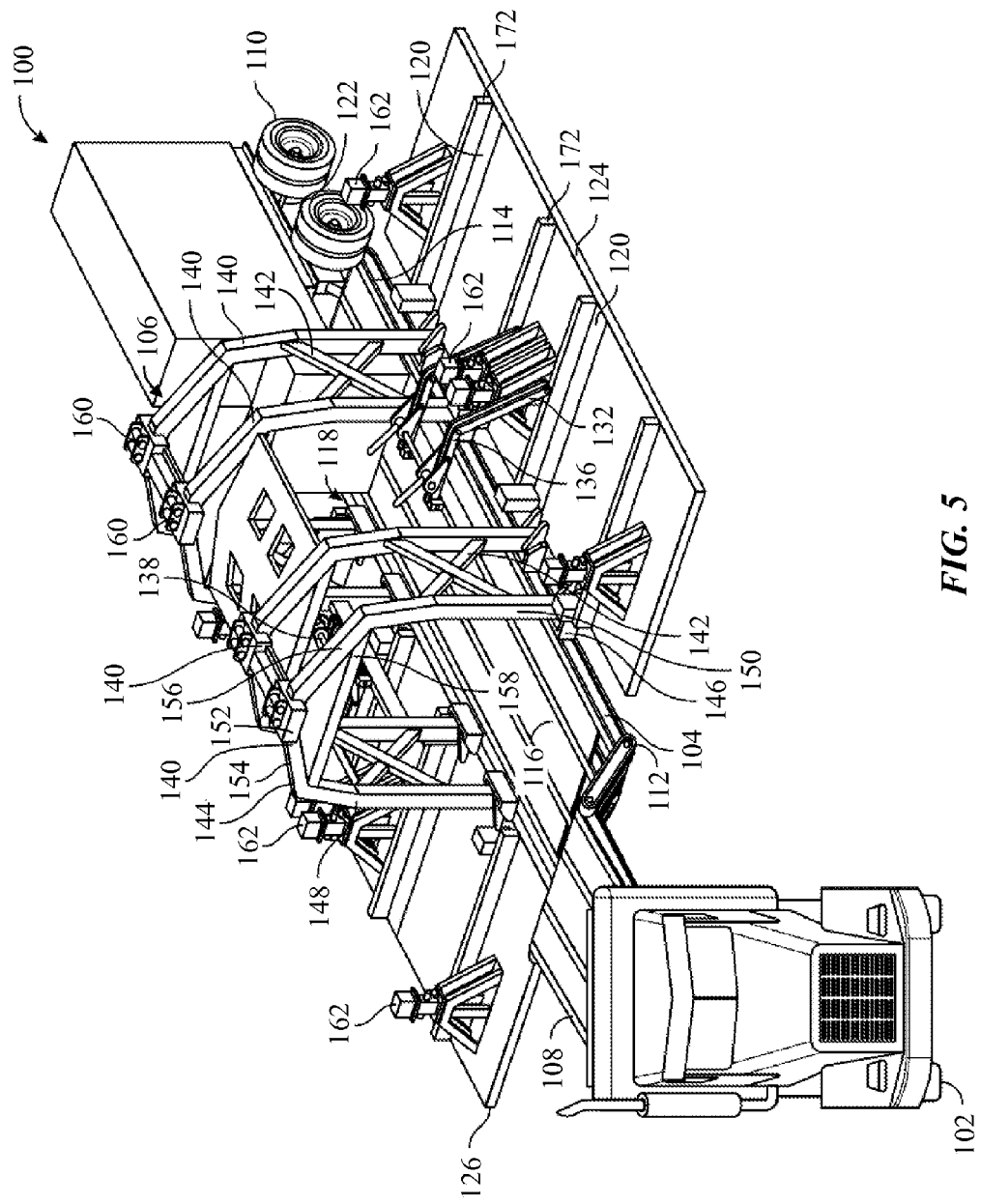
Figure 6:
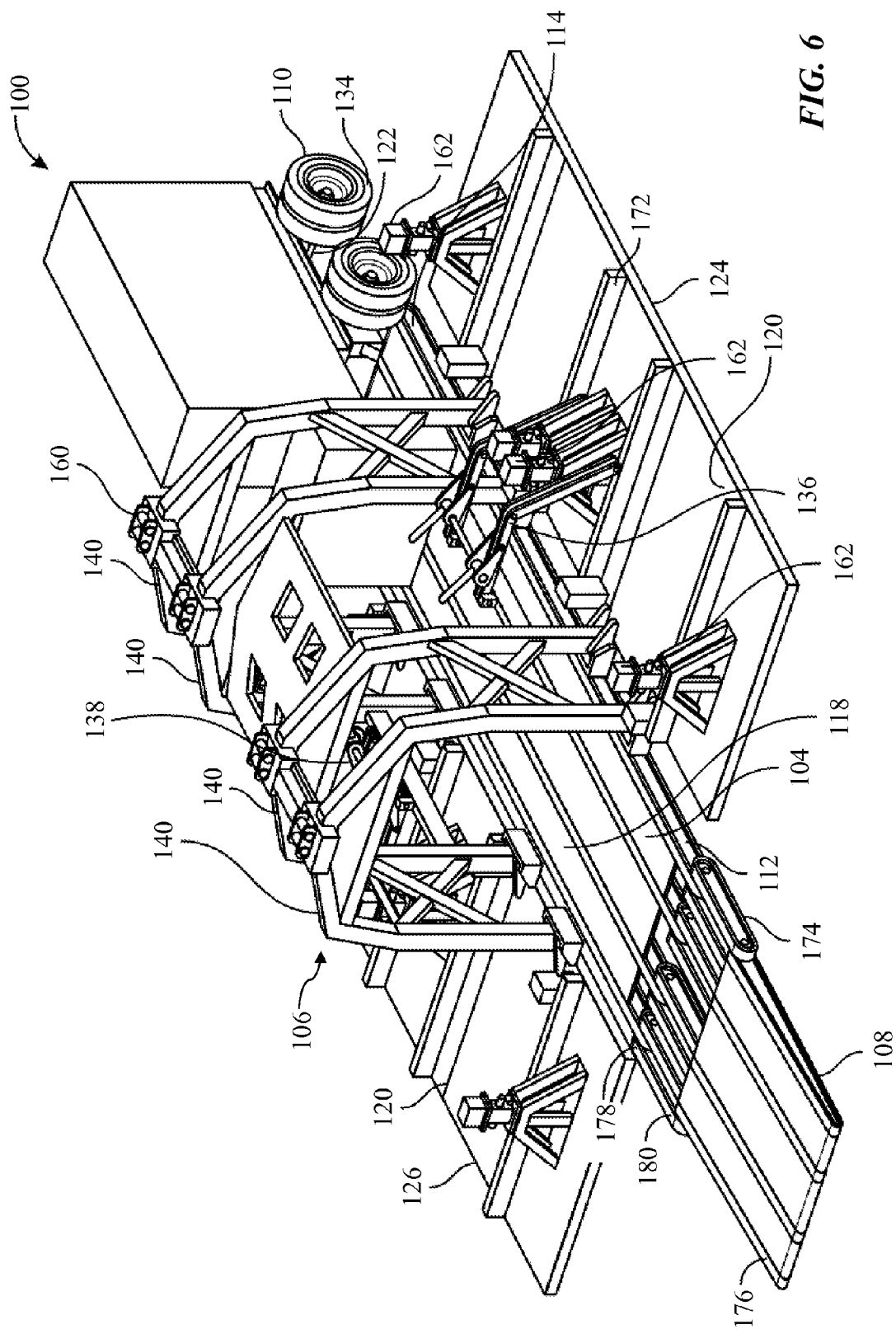

FIG. 4 is a perspective view of at least a portion of the MSS 100 in a transport orientation. FIG. 5 is a perspective view of the MSS 100 being deployed at a wellsite, such as the wellsite 12 shown in FIG. 1, and FIG. 6 is a perspective view of the MSS 100 in an operational orientation after such deployment. The following description refers to FIGS. 1 and 4-6, collectively.

The MSS 100 may comply with various state, federal, and international regulations for transport over roadways and highways. In this regard, the MSS 100 may have a width equal to or less than about 12 feet (or about 3.7 meters), a height equal to or less than about 13.5 feet (or about 4.1 meters), and a length equal to or less than about 53 feet (or about 16.2 meters).

The MSS 100 comprises one or more of a support base 104, a frame structure 106, a gooseneck portion 108, and wheels 110 supporting the support base 104, the frame structure 106, and the gooseneck portion 108. The gooseneck portion 108 may be attached to a truck 102 such that the truck 102 can move the MSS 100 between various wellsites and/or other locations. Thus, the MSS 100 may be transported to a wellsite and then set up to support the modular silos 18. The MSS 100 may support four modular silos 18, as depicted in the example implementation shown in FIG. 1, or another number of modular silos 18 in other implementations within the scope of the present disclosure.

The support base 104 may include a first end 112, a second end 114, a top surface 116, and a bottom surface (not shown). The frame structure 106 may extend above the support base 104 to define a passage 118 generally located between the top surface 116 and the frame structure 106. The frame structure 106 may resemble that which is shown in FIGS. 1 and 4-6, or as shown in FIGS. 2 and 3, or some combination thereof, among other examples within the scope of the present disclosure.

The frame structure 106 includes silo-receiving regions 120 that receive the modular silos 18. For example, the frame structure 106 depicted in FIGS. 1 and 4-6 includes four silo-receiving regions 120 each supporting a corresponding one of the modular silos 18. However, other implementations may include a different number of silo-receiving regions 120.

The gooseneck portion 108 may extend from the first end 112 of the support base 104 and connect to the truck 102. Axles 122 for the wheels 110 may be located proximate the second end 114 of the support base 104, for example.

The MSS 100 also includes a first expandable base 124 and a second expandable base 126 that may provide additional lateral support to the modular silos 18, such as may aid in preventing the modular silos 18 from falling over. The first and second expandable bases 124, 126 may also serve as a loading base for a truck during mounting the modular silos 18 to the MSS 100. In the example implementation depicted in FIGS. 1 and 4-6, the support base 104 includes a first side 128 and a second side 130, with the first expandable base 124 positioned on the first side 128 and the second expandable base 126 positioned on the second side 130.

The first and second expandable bases 124, 126 may be movably connected to at least one of the frame structure 106 and the support base 104 via one or more mechanical linkages 132, such that the first and second expandable bases 124, 126 may be selectively positioned between the transport orientation shown in FIG. 4 and the operational orientation shown in FIGS. 1, 5, and 6. In the transport orientation, the first and second expandable bases 124, 126 may extend substantially vertically adjacent or proximate the frame structure 106 so as to be within acceptable size limits for transporting the MSS 100 on public roadways. In the operational orientation, the first and second expandable bases 124, 126 may extend substantially horizontally from the frame structure 106, such as may aid in providing additional lateral support for the modular silos 18, and which may also provide a loading area for trucks during mounting of the modular silos 18 to the MSS 100.

The mechanical linkage 132 may include hinges connecting the first and second expandable bases 124, 126 to the frame structure 106. To automate movement of the first and second expandable bases 124, 126 between the transport and operational orientations, the mechanical linkage 132 may include a first set of actuators 136 and a second set of actuators 138. For example, the first set of actuators 136 may be connected between the frame structure 106 and the first expandable base 124, and the second set of actuators 138 may be connected between the frame structure 106 and the second expandable base 126. The first and second sets of actuators 136, 138 may include one or more hydraulic cylinders, pneumatic cylinders, solenoids, and/or other actuating means. In the example implementation depicted in FIGS. 5 and 6, the first and second sets of actuators 136, 138 each include two actuators, although another number of actuators may be utilized in other implementations.

The support base 104 may include a linkage (not shown) supported by the wheels 110 for moving the support base 104 in a substantially vertical direction relative to the wheels 110 between the transport orientation, in which the support base 104 is located above a lower portion 134 of the wheels 110 (as shown in FIG. 4), and an operational orientation in which the support base 104 is positioned on the ground and at least a portion of the support base 104 is aligned with the lower portion 134 of the wheels 110. When the support base 104 is positioned on the ground and the first and second expandable bases 124, 126 are positioned in the operational orientation, the support base 104 and the first and second expandable bases 124, 126 may be substantially coplanar. The support base 104 and the first and second expandable bases 124, 126 may also be positioned on a pad to aid in stabilizing the support base 104 and the expandable bases 124, 126 on the ground at the wellsite prior to erecting the modular silos 18.

The frame structure 106 may include a number of frames 140 interconnected by corresponding struts 142. The frames 140 may be substantially parallel to each other, and may be substantially similar in construction and function. Each frame 140 may include a top member 144, a bottom member 146, and two side members 148, 150, which may be connected to form a closed structure surrounding at least a portion of the passage 118. The bottom member 146 may be positioned within the passageway 118 extending through the support base 104, and may be connected to the side members 148, 150 to aid in maintaining a fixed distance between the side members 148, 150. The top member 144 and the side members 148, 150 may form an arch, such as may increase the structural strength and rigidity of each frame 140. The top member 144 may include an apex 152 centrally located between the side members 148, 150, such as in implementations in which the top member 144 includes a first leg 154 and a second leg 156 connected together at the apex 152. The first leg 154 may be connected to the side member 148 and the second leg 156 is connected to the side member 150. One or more of the frames 140 may also include a support beam 158, such as may aid in increasing the strength and rigidity of the frame 140. For example, the support beam 158 may reinforce the first and second legs 154, 156, such as may aid in preventing the first and second legs 154, 156 from deflecting relative to each other when supporting the modular silos 18. The frames 140 may comprise materials suitable to support the load of the modular silos 18, such as steel tubulars, beams, and/or other members connected via threaded fasteners, plates, welds, and/or other fastening means.

Each pair of frames 140 may cooperate to jointly support two modular silos 18 in corresponding silo-receiving regions 120 of the MSS 100. Within each silo-receiving region 120, the MSS 100 may also comprise a first connection 160 and a second connection 162. The first connection 160 within each silo-receiving region 120 may be located at the apexes 152 of a cooperating pair of the corresponding frames 140. The second connection 162 within each silo-receiving region 120 may be located on the corresponding one of the first and second expandable bases 124, 126 at a lower elevation relative to the first connection 160 to engage the silo frame 56 when the modular silo 18 is on the chassis 34.

Each first connection 160 may include two connectors that detachably attach to the silo frame 56 of the modular silos 18, and each second connection 162 may include two connectors that detachably attach to the silo frame 56 of the modular silos 18. For example, a truck/trailer transporting a modular silo 18 may be positioned (e.g., backed) to align a silo frame 56 of the modular silo 18 with the first and second connections 160, 162 of the corresponding silo-receiving region 120. To aid in such positioning, the first and second expandable bases 124, 126 may include alignment guides 172 within each silo-receiving region 120.

After the silo frame 56 of the modular silo 18 to be erected onto the MSS 100 is connected to the second connection 162, the modular silo 18 may be moved into the substantially vertical position along an arc-shaped path from the substantially lateral position on the truck/trailer. When the modular silo 18 is in the substantially vertical position, the silo frame 56 is further connected to the frame structure 106 via the first connection 160.

After the support base 104 and the first and second expandable bases 124, 126 have been deployed to the operational orientation, the truck 102 can be disconnected from the gooseneck portion 108 of the MSS 100, and the gooseneck portion 108 may be manipulated to lie on the ground and be generally co-planar with the support base 104. In this orientation, the gooseneck portion 108 may also form a ramp to aid in positioning the blending system 32 within the passage 118. For example, the gooseneck portion 108 may include a first section 174 and a second section 176, wherein the first section 174 may extend from the first end 112 of the support base 104. The first section 174 may have a first end 178 and a second end 180. The first end 178 may be movably connected to the support base 104, such as via one or more hinges, voids and pins, clevis joints, and/or other connectors, including those that may be locked at more than one position. The second section 176 may be movably connected to the second end 180 of the first section 174. For example, the first section 174 may be a four bar linkage that may be locked in an elevated position to form the gooseneck 108, or a lowered position to form the ramp.

Figure 7:
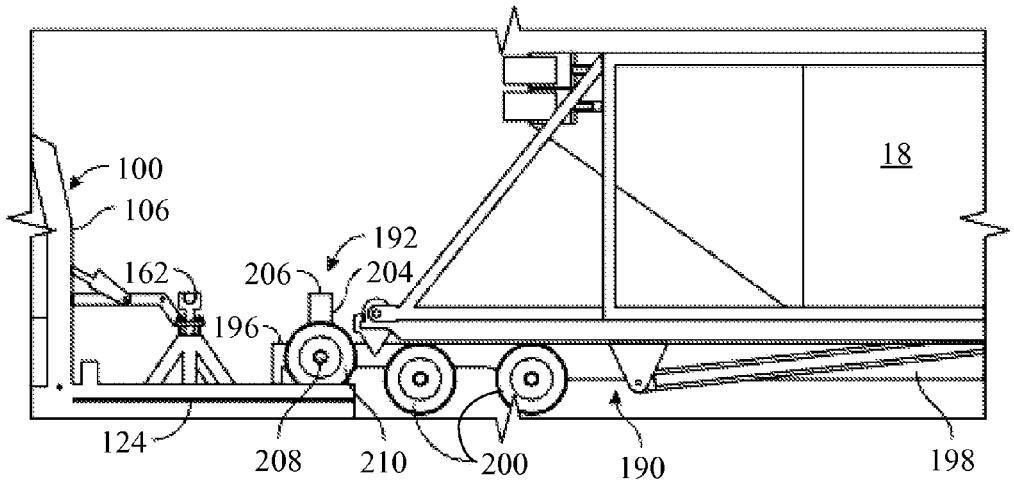
FIGS. 7-9 are elevation views of a portion of an example implementation of the apparatus shown in FIG. 1 during different stages of operation according to one or more aspects of the present disclosure.
Figure 8:
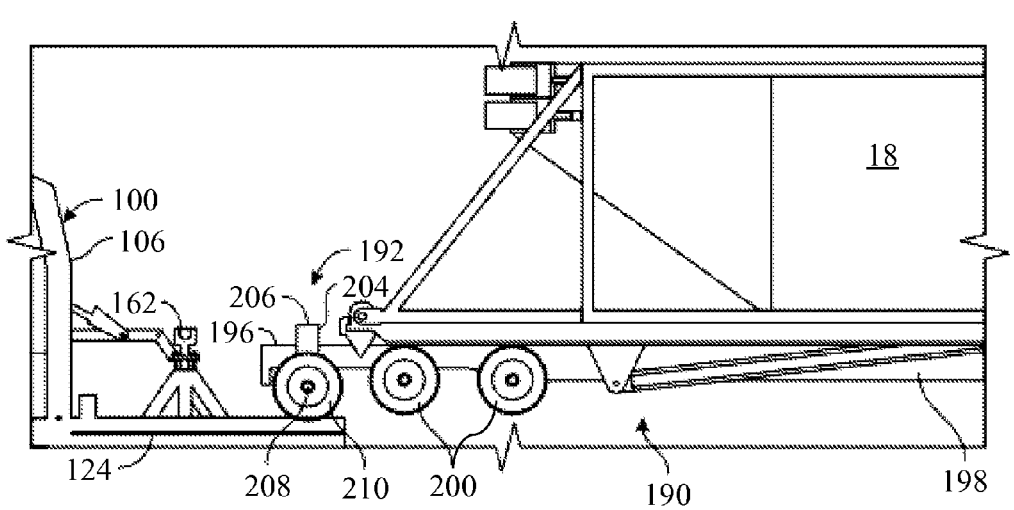
Figure 9:
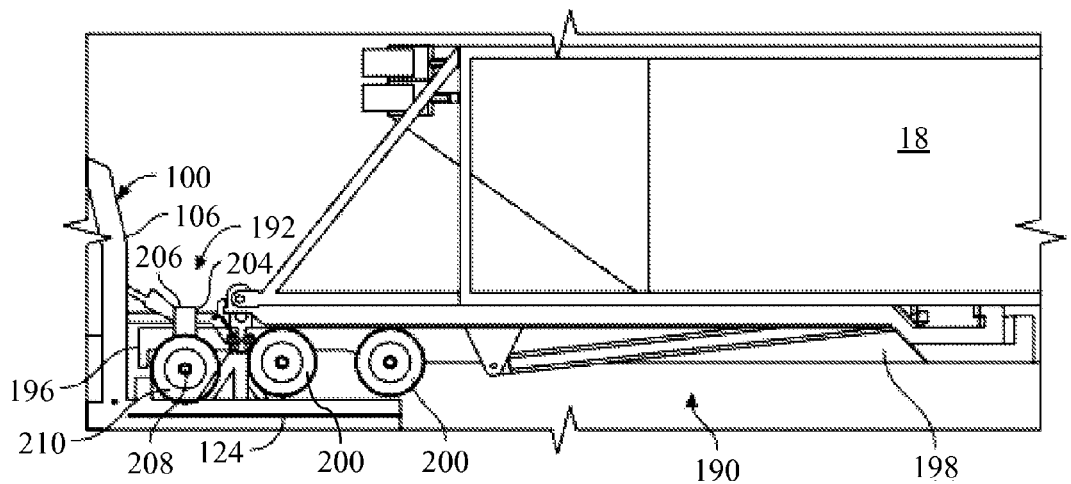

FIGS. 7-9 are elevation views of a portion of the apparatus shown in FIG. 1, depicting a chassis 190 supporting the modular silo 18 after transport to the wellsite 12, and during different stages of operation. The following description refers to FIGS. 1 and 7-9, collectively.

The chassis 190 may be formed as or otherwise carried by a portion of a trailer pulled by a truck, such as may be similar to the truck 28. The chassis 190 may be operable to erect the modular silo 18 to the substantially upright operational orientation in conjunction with the MSS 100. The chassis 190 may be included in or otherwise operate in conjunction with a chassis alignment assembly 192 to align the chassis 190 with the MSS 100.

The chassis 190 has a first end 194 (e.g., a front end; see FIG. 10), a second end 196 (e.g., a rear end or "rear"), a support beam 198 extending between the first end and second ends 194, 196, and wheels 200 located at least partially underneath the support beam 198 and operably connected to the support beam 198. The support beam 198 may comprise multiple pieces connected to collectively form a horizontal structural support. The wheels 200 may be located at least partially underneath a horizontal plane intersecting and parallel to the support beam 198. The chassis alignment assembly 192 may be used for horizontally and/or vertically aligning the modular silo 18 with a portion of the MSS 100.

In implementations in which the chassis 190 is implemented as a trailer, the chassis 190 may include a trailer hitch 202 (e.g., see FIG. 10) located at the first end 194 to couple the trailer 190 to a truck. The trailer hitch 202 may be a gooseneck hitch having a structure known in the art as a kingpin, for example.

The chassis alignment assembly 192 may include the chassis 190, a jacking assembly 204 connected to the chassis 190, and a jacking actuation member 206 operably connected to the jacking assembly 204 and the chassis 190. The jacking assembly 204 may have at least one axle 208 and one or more wheels 210 operably connected to the at least one axle 208. The jacking assembly 204 may be connected proximate the second end 196 of the chassis 190 such that the one or more wheels 210 extend beyond the second end 196 of the chassis 190. However, in other implementations, the jacking assembly 204 may be connected to the chassis 190 between the first end 194 and the second end 196 of the chassis 190, such that moving the jacking assembly 204 vertically displaces one or more of the wheels 200.

The jacking assembly 204 may be displaced substantially vertically with respect to the chassis 190 by operation of the jacking actuation member 206, such as to raise a vertical level of the silo frame 56 relative to the first connector 162 of the MSS 100. For example, the at least one axle 208 may be a fixed wheel axle (i.e., without a suspension mechanism) configured to raise (e.g., displace substantially vertically) the second end 196 of the chassis 190, such that one or more of the wheels 200 proximate the second end 196 of the chassis 190 are removed from contact with the ground (or underlying pad) when the jacking actuation member 206 vertically displaces the one or more wheels 210 of the jacking assembly 204 downward. The at least one axle 208 may be provided without a suspension mechanism so as to reduce mechanical compliance in the jacking assembly 204 and reduce variations in the structural geometry of the chassis 190 relative to the jacking assembly 204, such as may otherwise be caused by a suspension mechanism. The lack of a suspension mechanism may keep the structural geometry consistent so that orientation of the silo frame 56 relative to the MSS 100 is kept consistent, and may also permit the second end 196 of the chassis 190 to be supported on the first or second expandable bases 90, 124, or 126.

The jacking actuation member 206 may be operatively connected to the jacking assembly 204 and the chassis 190 to vertically displace the one or more wheels 210 upward or downward relative to the chassis 190. The jacking actuation member 206 may be or comprise a screw jack, a hydraulic jack, a pneumatic jack, an electrical actuator, a manual device, and/or other suitable mechanism operable to displace the jacking assembly 204 with sufficient force to raise the set of wheels 200 off of the ground.

FIGS. 10-15 are perspective and elevation views of different portions and operational stages of another example implementation of a chassis alignment assembly 220 for horizontally aligning the silo frame 56 of the modular silo 18 with a portion of the MSS 100 to facilitate the connection of the modular silo 18 to the MSS 100. The following description refers to FIGS. 1 and 10-15, collectively.

The chassis alignment assembly 220 may include the chassis 190 and an outrigger assembly 222. The outrigger assembly 222 may include a frame 224 connected to the chassis 190, at least one axle 226 connected to the frame 224, wheels 228 operably connected to the at least one axle 226, and an outrigger actuation member 230 operably coupled to the frame 224 and the support beam 198. The frame 224 may include a first end 232 and a second end 234, with a longitudinal axis extending between the first and second ends 232, 234. The at least one axle 226 may extend transverse to the longitudinal axis of the chassis 190. The longitudinal axis of the chassis 190 may be deemed a first longitudinal axis and the longitudinal axis of the frame 224 may be a second longitudinal axis.

Figure 10:
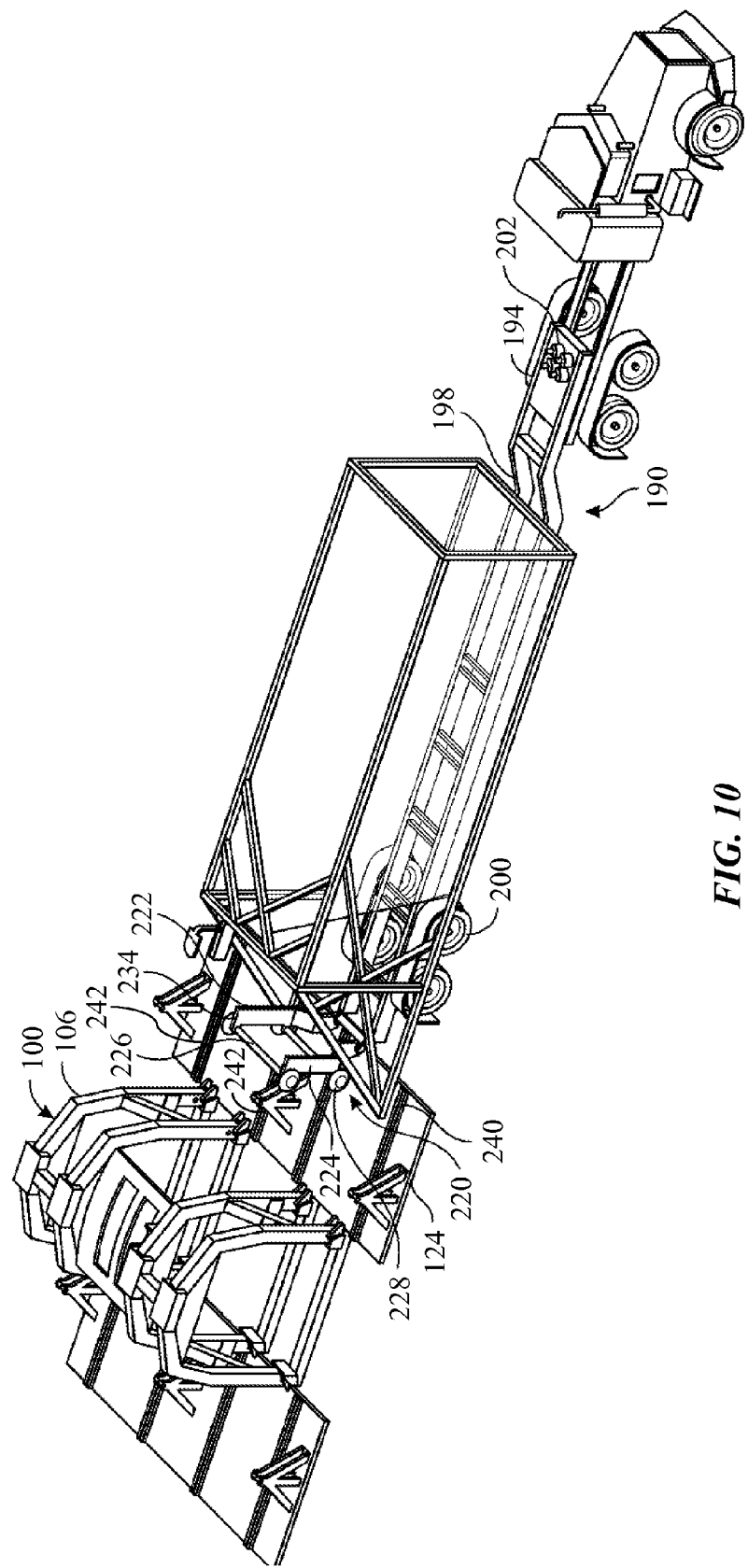
FIGS. 10-15 are perspective and elevation views of different portions and operational stages of at least a portion of another example implementation of the apparatus shown in FIGS. 7-9 according to one or more aspects of the present disclosure.
Figure 11:
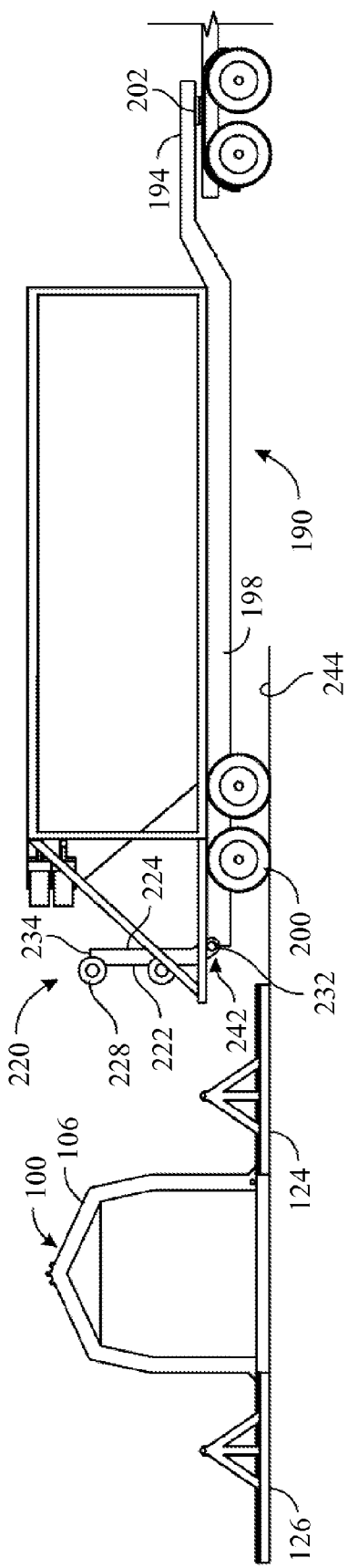
Figure 12:
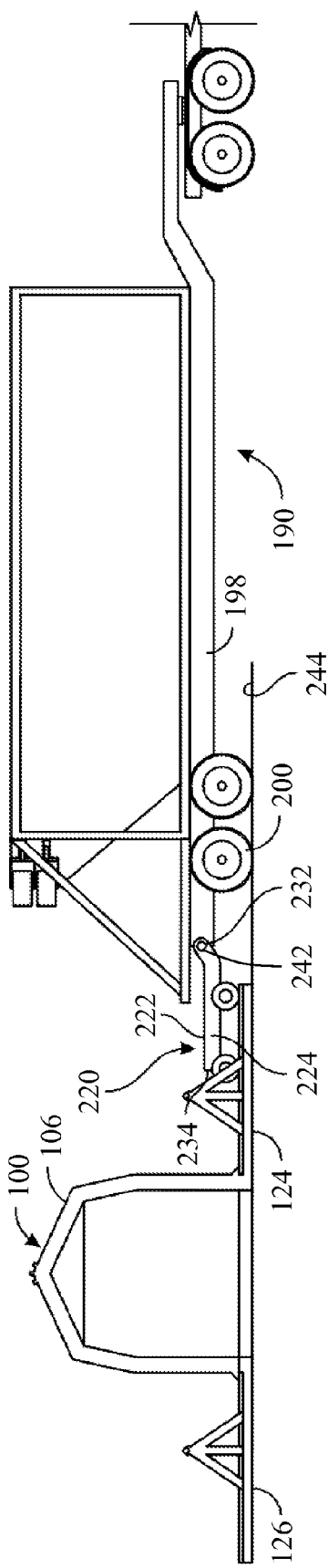
Figure 13:
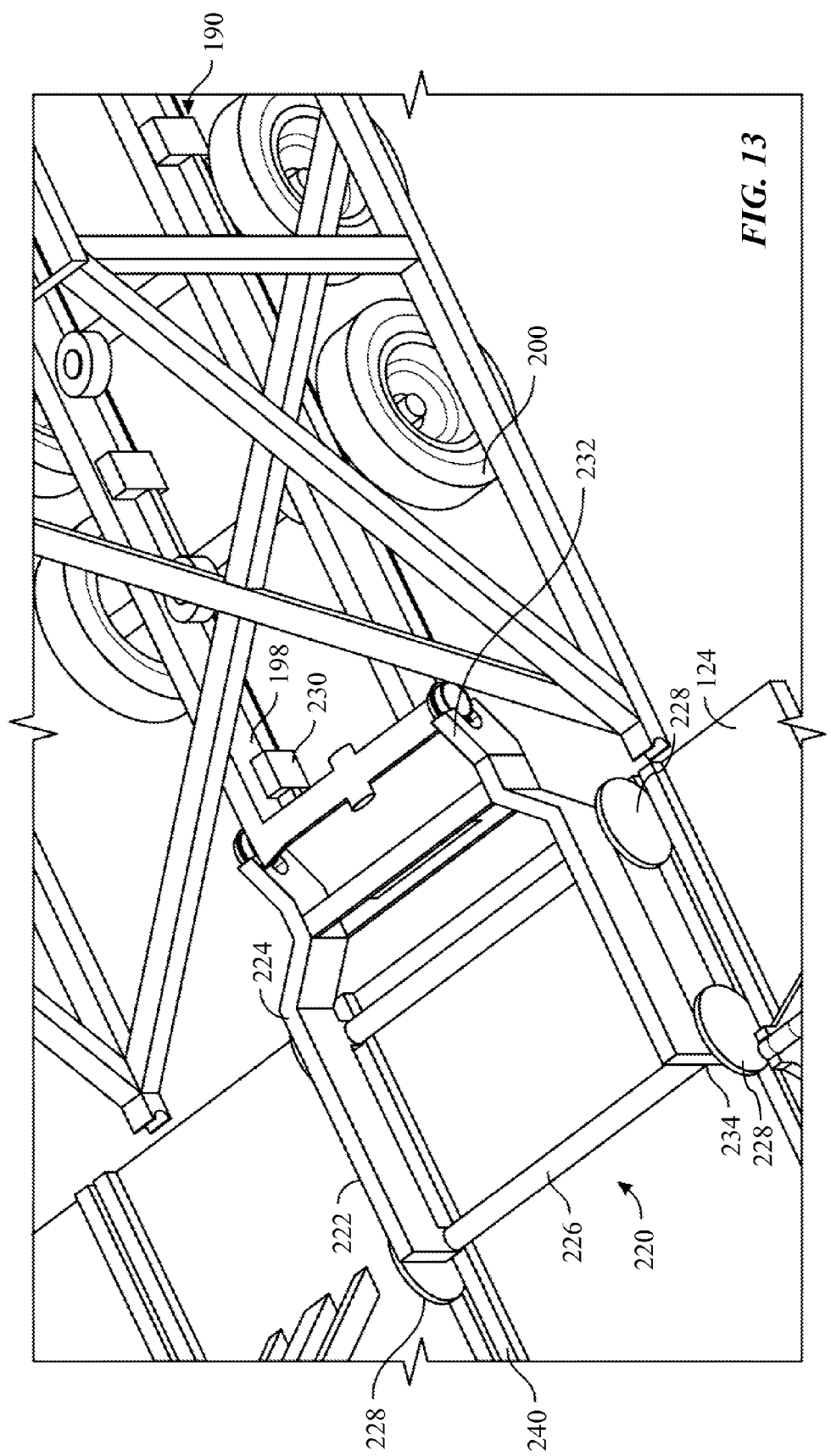
Figure 14:
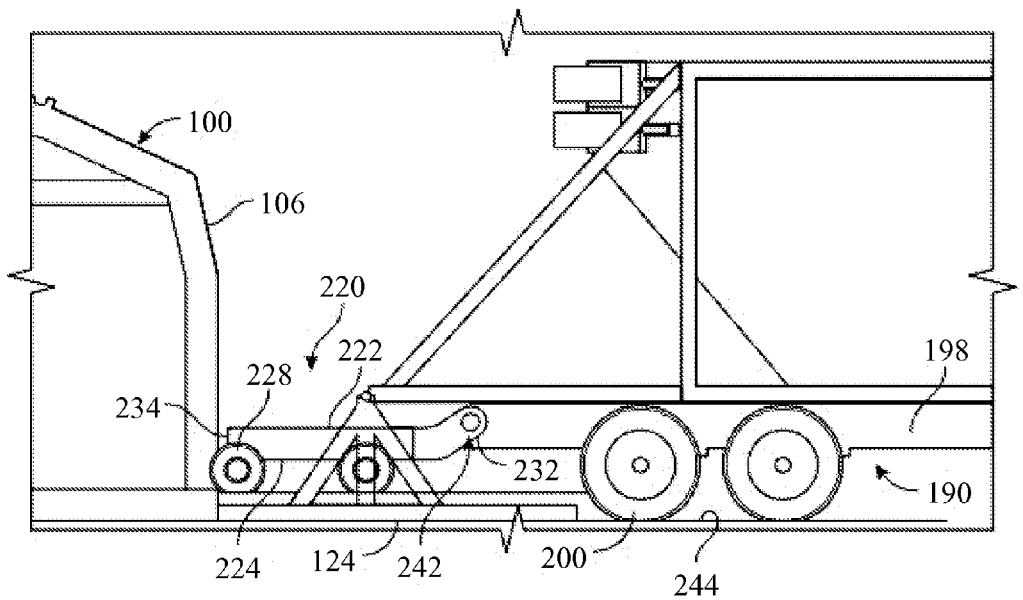
Figure 15:
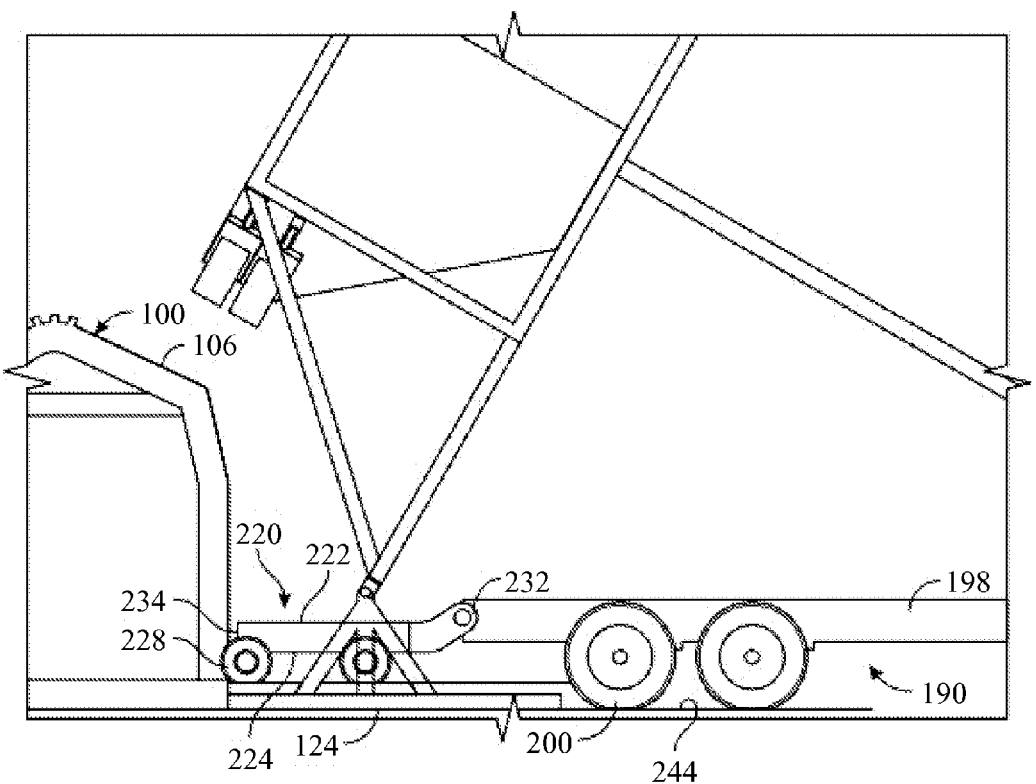

The first end 232 may be movably coupled to the support beam 198 for movement between a transport orientation, shown in FIGS. 10 and 11, and an alignment orientation, shown in FIGS. 12-15. When the frame 224 is in the transport orientation, the second longitudinal axis (of the frame 224) may be positioned at an angle relative to the first longitudinal axis (of the chassis 190), such as within about ten degrees from vertical with respect to the first longitudinal axis (e.g., at an angle ranging between about eighty degrees and about 100 degrees relative to the first longitudinal axis). In the alignment orientation, the frame 224 may extend beyond the second end 196 of the chassis 190, and may be substantially aligned with a horizontal plane intersecting the wheels 200 of the chassis 190. In the transport orientation, the frame 224 may be positioned above the horizontal plane intersecting the wheels 200 of the chassis 190, such as substantially vertical with respect to the chassis 190.

The at least one axle 226 may be operatively connected to the frame 224 such that the wheels 228 connected to the at least one axle 226 may rotate when in contact with tracks 240 supported by the support base 52 and/or the corresponding expandable bases 90, 124, 126. The at least one axle 226 may be positioned on the frame 224 substantially perpendicular with an axis passing through the first and second ends 232, 234. The at least one axle 226 may be a fixed wheel axle provided without a suspension mechanism.

The wheels 228 may be substantially rigid and/or otherwise similar to wheels of train cars and/or other vehicles that ride on rails. The tracks 240 may be rigidly fixed to the support base 52 and/or the corresponding expandable base 90, 124, 126, such as may permit the wheels 228 to rest and ride on the tracks 240. Engagement of the wheels 228 and the tracks 240 may aid in aligning at least a portion of the chassis 190 with the MSS 100.

The outrigger actuation member 230 may be operable to move the frame 224 along a substantially arc-shaped path. For example, the outrigger actuation member 230 may be or comprise one or more hydraulic, pneumatic, mechanical, electrical, and/or other suitable actuation members operable to pivotally move the frame 224 between the transport and alignment orientations. The outrigger actuation member 230 may cause the frame 224 to pivot about a pivot point 242 proximate the first end 232 of the frame 224 and/or proximate the second end 196 of the chassis 190. The outrigger actuation member 230 may also be operable to lift the wheels 200 proximate the second end 196 of the chassis 190 above the ground level 244, such as may aid in aligning at least a portion of the chassis 190 with the MSS 100.

Figure 16:
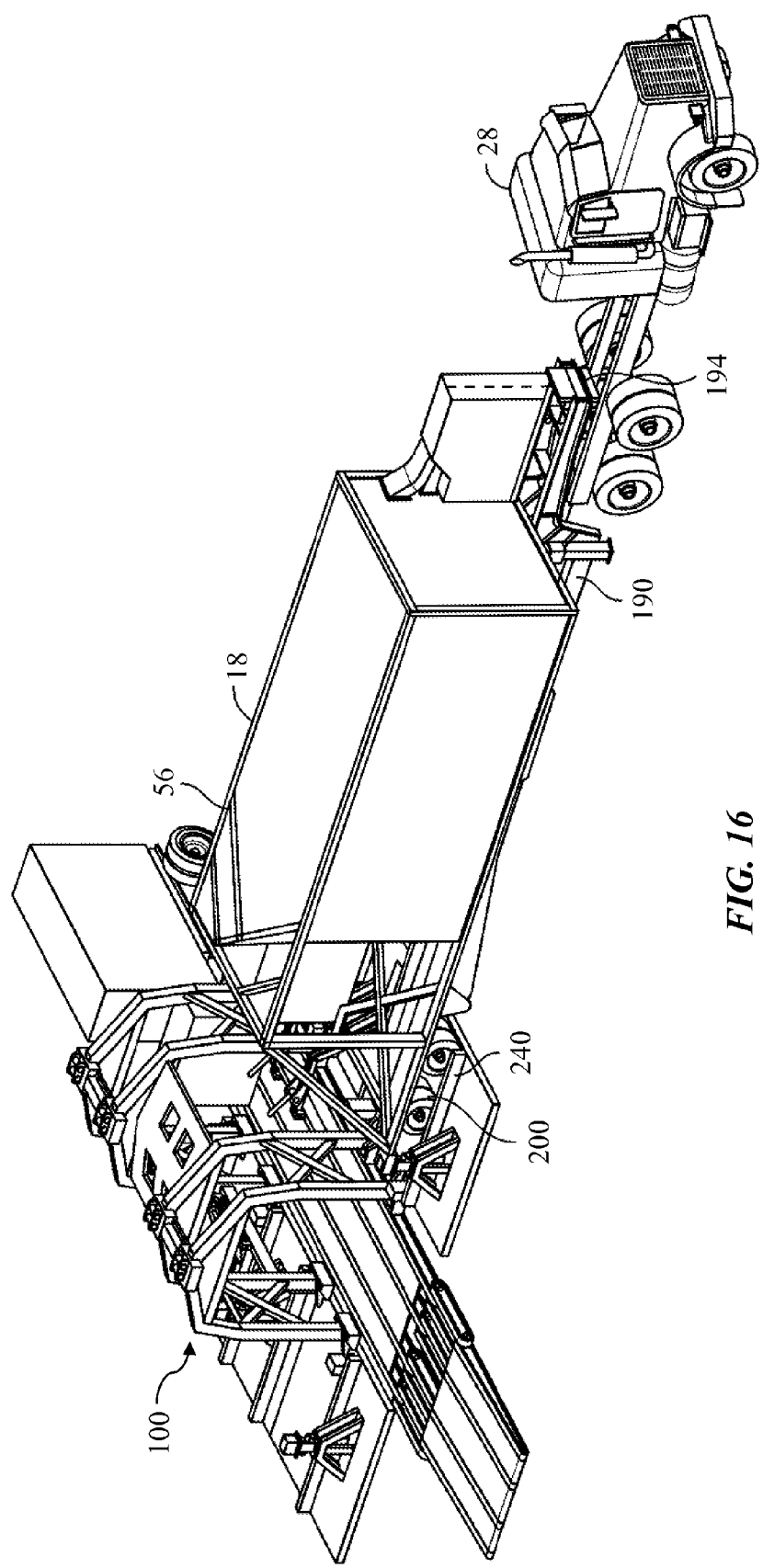
FIGS. 16-18 are perspective views of different operational stages of a method according to one or more aspects of the present disclosure.
Figure 17:
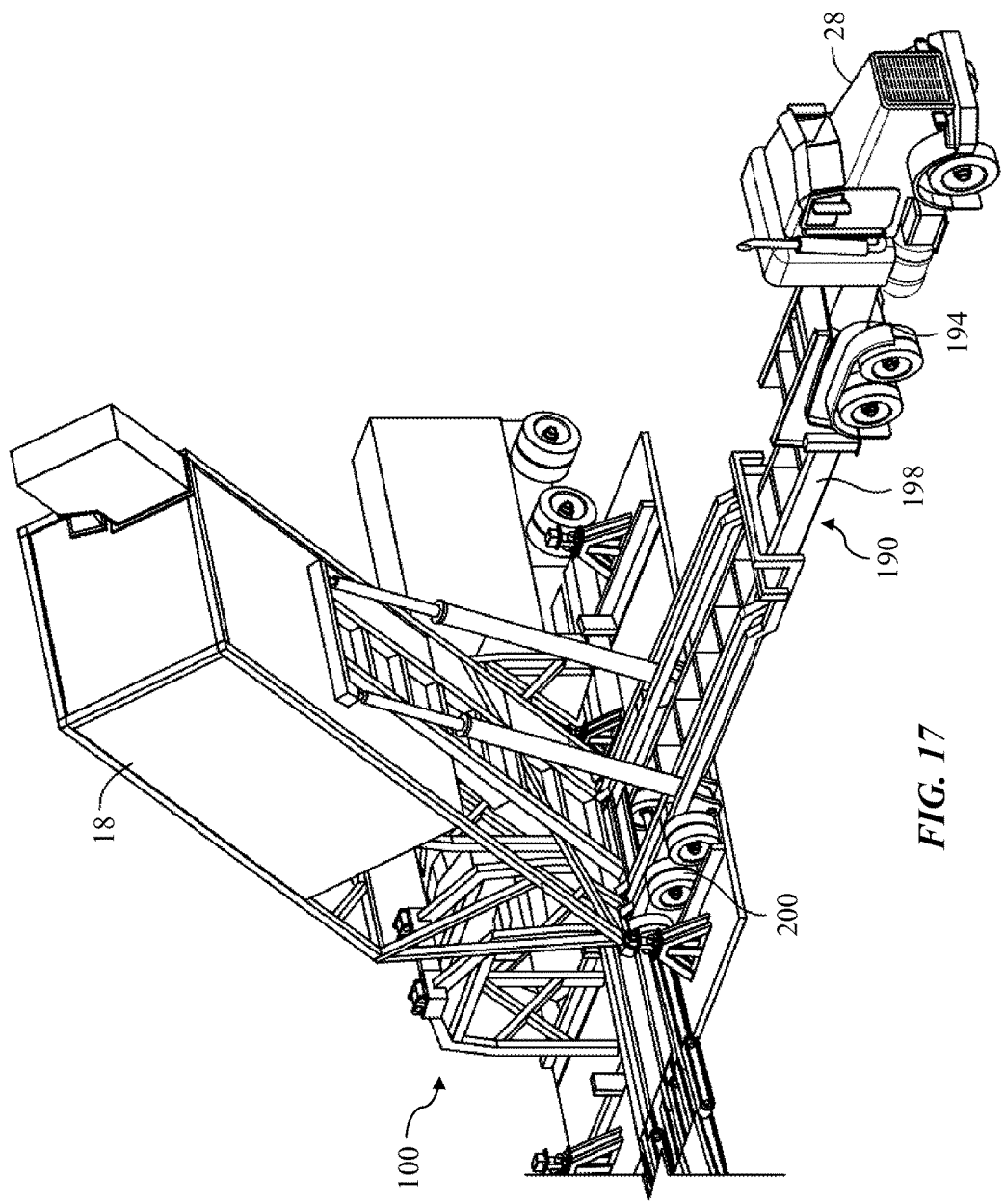
Figure 18:
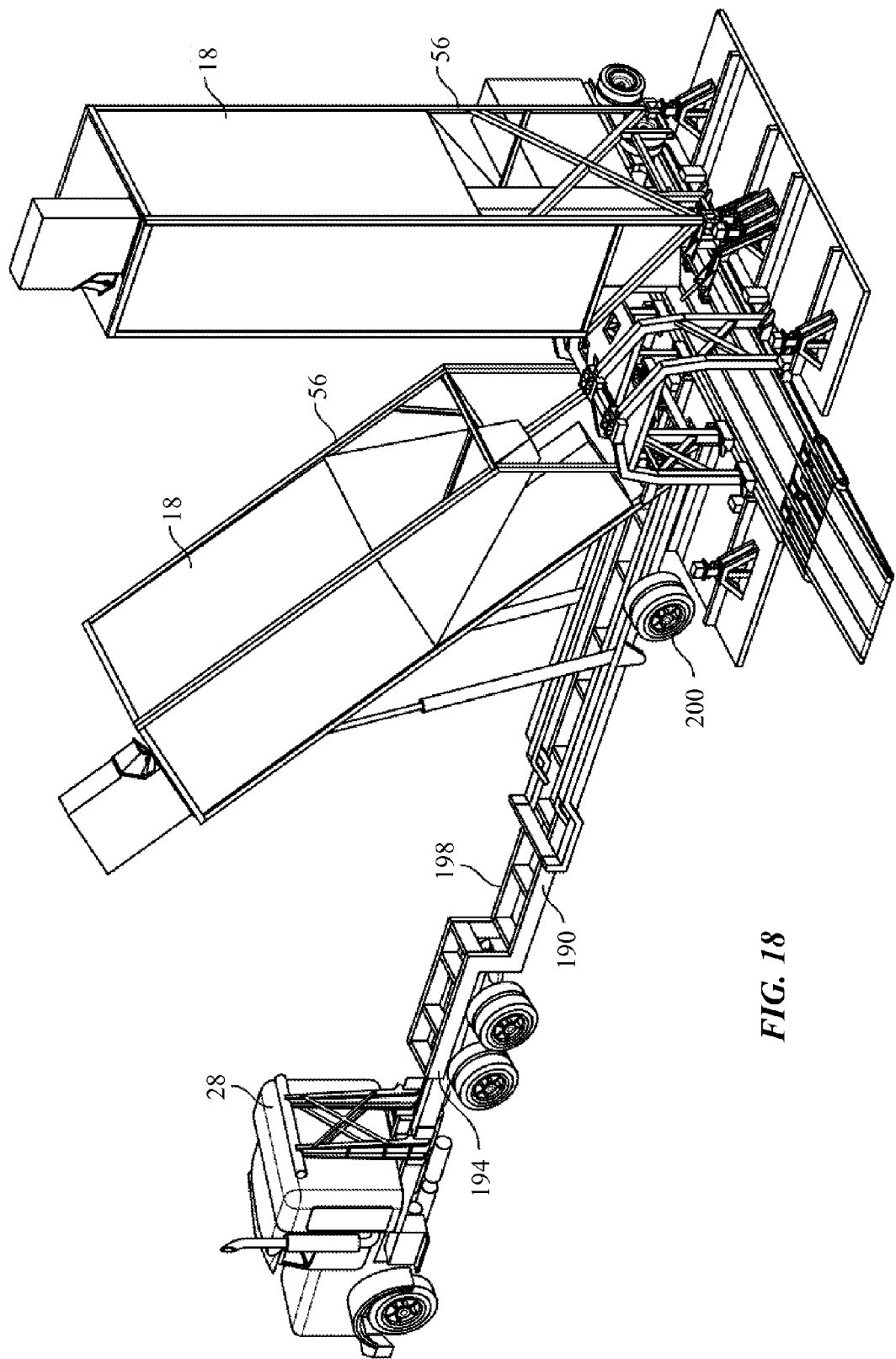

FIGS. 16-18 are perspective views of different operational stages of a method for positioning modular silos 18 on the MSS 100. For example, the modular silo 18 may initially be positioned in a substantially lateral orientation on the chassis 190. In implementations in which the chassis 190 is implemented as a trailer, the first end 194 of the trailer may be operably connected to a truck 28. The chassis 190 may have the trailer alignment assembly 192 (shown in FIGS. 7-9) or the trailer alignment assembly 220 (shown in FIGS. 10-15) connected to the second end 196 of the chassis 190.

As shown in FIG. 16, the chassis 190 may be moved (e.g., backed) toward the MSS 100 such that the chassis 190, the modular silo 18, and/or the MSS 100 partially overlap. At this point in the assembly method, the modular silo 18 may be connected to the MSS 100 via the first connection 160 shown in FIGS. 5 and 6.

In implementations in which the chassis 190 includes the trailer alignment assembly 192, the jacking actuation member 206 of the jacking assembly 204 (See FIGS. 7-9) may be operated to raise the second end 196 of the chassis 190 upward to an alignment position, such that the rear end 196 of the chassis 190 may be at least partially supported by the at least one wheel 210 of the jacking assembly 204. For example, the jacking actuation member 206 may cause the jacking assembly 204 to be vertically displaced downward in relation to the chassis 190, thereby raising the wheels 200 proximate the second end 196 above a ground level, and thus raising the chassis 190 and unloading the wheels 200 such that they no longer support a portion of a weight of the chassis 190. Accordingly, the wheels 200 may be unloaded such that they no longer support the on-road weight of the chassis 190. The wheels 200 may still touch the ground, but the wheels 200 do not support the same weight of the chassis 190, including the weight of the modular silo 18 on the chassis 190, relative to the weight that is supported by the wheels 200 when the chassis 190 is in the transport orientation. The chassis 190 may then be moved (e.g., backed) while the chassis 190 is in the alignment position, such that portions of the modular silo 18 and the MSS 100 overlap.

Moving the chassis 190 toward the MSS 100 may utilize the alignment guides 172 (see FIGS. 5 and 6) of the first and second expandable bases 124, 126 of the MSS 100. For example, the chassis 190 may be moved such that the wheels 210 and/or other portion of the chassis 190 contact the alignment guides 172 to align at least a portion of the chassis 190 with the MSS 100. The jacking actuation member 204 may then be actuated to lower the chassis 190 and the wheels 200 onto the MSS 100, thereby aligning at least a portion of the chassis 190 with the MSS 100. As shown in FIGS. 17 and 18, the modular silo 18 may then be erected from the substantially lateral position towards a substantially upright position (shown in FIG. 1) on the MSS 100 to connect the modular silo 18 and MSS 100 at the first connection 160. After erecting the modular silo 18, the jacking actuation member 206 may raise the wheels 210 of the chassis 190 by vertically displacing the jacking assembly 204, thereby permitting the chassis 190 to be removed from the MSS 100.

In implementations in which the chassis 190 includes the trailer alignment assembly 220 and the outrigger assembly 222 (See FIGS. 10-15), the outrigger assembly 222 may be actuated to move the frame 224 of the outrigger assembly 222 downward into the alignment orientation such that the frame 224 of the outrigger assembly 222 extends beyond the second end 196 of the chassis 190 and is substantially aligned with a horizontal plane intersecting one or more wheels 200 of the chassis 190. Thus, the frame 224 may be aligned with the MSS 100. For example, the frame 224 may be placed in the alignment orientation, aligning the frame 224 with the first and/or second expandable base 124 and/or 126 of the MSS 100. The chassis 190 may then be moved toward the MSS 100 while the outrigger assembly 222 is in the alignment orientation such that portions of the modular silo 18 and the MSS 100 overlap and the wheels 228 of the outrigger assembly 222 engage at least one track 240 affixed to the MSS 100. The wheels 228 may then be engaged with the tracks 240, thereby causing at least a portion of the chassis 190 to horizontally align with the MSS 100 prior to erecting the modular silo 18.

In view of the entirety of the present disclosure, including the figures and the claims, a person having ordinary skill in the art will readily recognize that the present disclosure introduces a chassis alignment assembly comprising: a chassis comprising a first set of wheels; a jacking assembly coupled to the chassis and comprising at least one axle and one or more wheels operably connected to the at least one axle; and a jacking actuation member coupled to the jacking assembly and the chassis and operable to vertically displace the one or more wheels of the jacking assembly relative to the chassis to engage a ground and raise the first set of wheels of the chassis off of the ground such that the jacking assembly supports an end of the chassis.

The at least one axle may be a fixed wheel axle.

The wheels of the jacking assembly may be disposed beyond the end of the chassis.

The chassis may be a trailer that may comprise a trailer hitch.

The chassis may be movable on the one or more wheels of the jacking assembly when the first set of wheels of the chassis is vertically displaced off of the ground.

The one or more wheels of the jacking assembly may be positioned in a horizontal plane intersecting at least a portion of the first set of wheels of the chassis.

The first set of wheels of the chassis may not support the weight of the chassis when the one or more wheels of the jacking assembly engage the ground.

The present disclosure also introduces a chassis alignment assembly comprising: a chassis comprising a plurality of wheels; and an outrigger assembly comprising: a frame movably coupled to the chassis for movement between a transport orientation and an alignment orientation, wherein the frame extends beyond an end of the chassis when in the alignment orientation; at least one axle connected to the frame and extending transverse to a longitudinal axis of the chassis; at least one wheel connected to the at least one axle; and an outrigger actuation member coupled between the frame and the chassis.

An end of the outrigger actuation member may be coupled to and/or supported by the chassis, and may be operable to move the frame along an arc-shaped path.

The longitudinal axis of the chassis may be a first longitudinal axis, and the frame may have a second longitudinal axis extending in a plane that may be substantially coincident with the first longitudinal axis. In such implementations, the second longitudinal axis may be positioned at a non-parallel angle with respect to the first longitudinal axis when the frame is in the transport orientation.

The chassis may form at least a portion of a trailer that may comprise a trailer hitch.

The frame may be substantially aligned with a horizontal plane that may intersect the wheels of the chassis when in the alignment orientation.

The movement of the outrigger actuation member may cause movement of the frame between the transport and alignment orientations.

The present disclosure also introduces a method comprising: positioning a modular silo in a substantially lateral orientation on a chassis, wherein the chassis comprises: a set of wheels supporting the chassis on a ground; and a jacking assembly comprising at least one wheel; operating the jacking assembly to raise an end of the chassis to an alignment orientation such that the end of the chassis is at least partially supported by the at least one wheel of the jacking assembly and such that the set of wheels of the chassis are unloaded; moving the chassis while in the alignment orientation such that portions of the modular silo and a mobile support structure (MSS) overlap; and erecting the modular silo from the substantially lateral position to a substantially upright position while the chassis is in the alignment orientation.

The jacking assembly may further comprise at least one axle, and the at least one wheel may be operably connected to the at least one axle. In such implementations, the at least one axle may be a fixed wheel axle.

The MSS may comprise an expandable base, and the expandable base may comprise an alignment guide. In such implementations, the method may further comprise: moving the expandable base from a transport orientation to an operational orientation; and then aligning the chassis with the MSS, during the movement of the chassis while in the alignment orientation, by utilizing the alignment guide for aligning the jacking assembly relative to the MSS.

The method may further comprise connecting the modular silo and the MSS after erecting the modular silo.

The present disclosure also introduces a method comprising: positioning a modular silo in a substantially lateral orientation on a chassis, wherein the chassis comprises an outrigger assembly having at least one wheel; actuating the outrigger assembly to move a frame of the outrigger assembly downward into an alignment orientation such that the frame extends beyond an end of the chassis and is substantially aligned with an expandable base of a mobile support structure (MSS) to which the modular silo is to be assembled; moving the chassis toward the MSS while the outrigger assembly is in the alignment orientation such that portions of the modular silo and the expandable base overlap and such that the at least one wheel of the outrigger assembly engages a track of the expandable base; and erecting the modular silo from the substantially lateral orientation to a substantially upright orientation while the frame is in the alignment orientation.

Such method may further comprise moving the expandable base from a transport orientation to an operational orientation before actuating the outrigger assembly and moving the chassis toward the MSS.

Actuating the outrigger assembly may comprise actuating an outrigger actuation member of the outrigger assembly to move the frame of the outrigger assembly from a transport orientation to the alignment orientation.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

What is claimed is:

1. A method, comprising:
    positioning a modular silo in a substantially lateral orientation on a chassis, wherein the chassis comprises:
        a set of wheels supporting the chassis on a ground; and
        a jacking assembly comprising at least one wheel;
    operating the jacking assembly to raise an end of the chassis to an alignment orientation such that the end of the chassis is at least partially supported by the at least one wheel of the jacking assembly and such that the set of wheels of the chassis are unloaded;
    moving the chassis while in the alignment orientation such that portions of the modular silo and a mobile support structure (MSS) overlap; and
    erecting the modular silo from the substantially lateral position to a substantially upright position while the chassis is in the alignment orientation.

2. The method of claim 1 wherein the jacking assembly further comprises at least one axle and the at least one wheel is operably connected to the at least one axle.

3. The method of claim 2 wherein the at least one axle is a fixed wheel axle.

4. The method of claim 1 wherein the MSS comprises an expandable base, wherein the expandable base comprises an alignment guide, and wherein the method further comprises:
    moving the expandable base from a transport orientation to an operational orientation; and
    then aligning the chassis with the MSS, during the movement of the chassis while in the alignment orientation, by utilizing the alignment guide for aligning the jacking assembly relative to the MSS.

5. The method of claim 1 further comprising connecting the modular silo and the MSS after erecting the modular silo.

6. A method, comprising:
    positioning a modular silo in a substantially lateral orientation on a chassis, wherein the chassis comprises an outrigger assembly having at least one wheel;
    actuating the outrigger assembly to move a frame of the outrigger assembly downward into an alignment orientation such that the frame extends beyond an end of the chassis and is substantially aligned with an expandable base of a mobile support structure (MSS) to which the modular silo is to be assembled;
    moving the chassis toward the MSS while the outrigger assembly is in the alignment orientation such that portions of the modular silo and the expandable base overlap and such that the at least one wheel of the outrigger assembly engages a track of the expandable base; and erecting the modular silo from the substantially lateral orientation to a substantially upright orientation while the frame is in the alignment orientation.

7. The method of claim 6 further comprising moving the expandable base from a transport orientation to an operational orientation before actuating the outrigger assembly and moving the chassis toward the MSS.

8. The method of claim 6 wherein actuating the outrigger assembly comprises actuating an outrigger actuation member of the outrigger assembly to move the frame of the outrigger assembly from a transport orientation to the alignment orientation.

* * * * *